US008920978B1

(12) United States Patent
Gross et al.

(10) Patent No.: US 8,920,978 B1
(45) Date of Patent: Dec. 30, 2014

(54) POROUS CONDUCTIVE SCAFFOLDS CONTAINING BATTERY MATERIALS

(75) Inventors: Adam F. Gross, Los Angeles, CA (US); John J. Vajo, West Hills, CA (US); Ping Liu, Irvine, CA (US); Elena Sherman, Culver City, CA (US)

(73) Assignee: HRL Laboratories, LLC, Malibu, CA (US)

( * ) Notice: Subject to any disclaimer, the term of this patent is extended or adjusted under 35 U.S.C. 154(b) by 753 days.

(21) Appl. No.: 12/476,258

(22) Filed: Jun. 2, 2009

(51) Int. Cl.
*H01M 4/66* (2006.01)

(52) U.S. Cl.
USPC .......................................... 429/236

(58) Field of Classification Search
CPC ..................................... H01M 4/663
USPC ................. 429/122–347, 233–238
See application file for complete search history.

(56) References Cited

U.S. PATENT DOCUMENTS

| 5,958,624 | A | 9/1999 | Frech et al. |
| 6,492,014 | B1 | 12/2002 | Rolison et al. |
| 7,457,018 | B2 | 11/2008 | Armand et al. |
| 2005/0287421 | A1* | 12/2005 | Simon et al. ................. 429/44 |
| 2007/0286796 | A1 | 12/2007 | Koper et al. |
| 2008/0057402 | A1* | 3/2008 | Abe et al. ..................... 429/333 |
| 2008/0248192 | A1 | 10/2008 | Long et al. |
| 2009/0185327 | A1* | 7/2009 | Seymour ...................... 361/500 |

OTHER PUBLICATIONS

Sakamoto et al., Vanadium Oxide-Carbon Nanotube Composite Electrodes for Use in Secondary Lithium Batteries, Dec. 2001, Journal of the Electrochemical Society, vol. 149, No. 1, pp. A26-A30.*
Hwang and Hyun, "Synthesis and characterization of tin oxide/carbon aerogel composite electrodes for electrochemical supercapacitors," Journal of Power Sources 172 (2007) 451-459, Elsevier, New York, NY, U.S.

* cited by examiner

*Primary Examiner* — Jonathan G Leong
(74) *Attorney, Agent, or Firm* — O'Connor & Company

(57) ABSTRACT

The present invention provides a battery electrode comprising an active battery material enclosed in the pores of a conductive nanoporous scaffold. The pores in the scaffold constrain the dimensions for the active battery material and inhibit sintering, which results in better cycling stability, longer battery lifetime, and greater power through less agglomeration. Additionally, the scaffold forms electrically conducting pathways to the active battery nanoparticles that are dispersed. In some variations, a battery electrode of the invention includes an electrically conductive scaffold material with pores having at least one length dimension selected from about 0.5 nm to about 100 nm, and an oxide material contained within the pores, wherein the oxide material is electrochemically active.

15 Claims, 6 Drawing Sheets

POROUS CONDUCTIVE SCAFFOLDS CONTAINING BATTERY MATERIALS

FIELD OF THE INVENTION

The present invention generally relates to improved batteries, and methods of making such batteries.

BACKGROUND OF THE INVENTION

Batteries based on lithium (Li), such as lithium-ion batteries, are attractive due to their high energy density compared to other commercial batteries (e.g., alkaline batteries). Li-ion batteries are used commercially in computers, cell phones, and related devices. Li-ion batteries have potential for use in electric vehicle and hybrid-electric vehicle applications.

It is desirable to maintain high battery capacity while being electrochemically reversible. Appropriate nanomaterials enable fast reaction kinetics due to reduced diffusion distances. Higher power output and faster charging times can result when lithium ions are able to diffuse into and out of the active battery material quickly. Nanometer-sized battery materials have multiple challenges for implementation, however.

When batteries are cycled through charging and discharging reactions, agglomeration can lead to bulk structures, derived from the nanomaterials, within the battery. Bulk structures have relatively long diffusion distances which results in slower ion diffusion during battery operation, and thus lower power output. Additionally, bulk structures can readily lose electrical contact with the electrode due to stress cracking as ions diffuse into and out of them, thereby reducing battery capacity.

Also, it is difficult to form electrical connections to nanomaterials that are present in high density. Nanomaterials may be deposited on a two-dimensional surface, but this causes a low density of active battery material. If nanomaterials are dispersed with a conductive material such as carbon black, a significant portion of nanoparticles will be in poor electrical contact with the electrode, which will cause capacity loss.

The current state of the art is deficient with respect to the utilization of nanometer-sized battery materials. What is needed is a method to control the dimensions associated with the active battery material, such as through the presence of a scaffold material. It would be particularly desirable to employ a conductive and chemically stable scaffold suitable for infiltrating a liquid precursor of one or more desired active battery materials, such as oxides and phosphates.

SUMMARY OF THE INVENTION

The present invention addresses the aforementioned needs in the art, as will now be summarized and further described in detail below.

In some variations, a battery electrode is provided, for a lithium-ion or other suitable battery, the battery electrode comprising: (a) a scaffold material including pores having at least one length dimension selected from about 0.5 nm to about 100 nm, wherein the scaffold material is capable of conducting electrons; and (b) an oxide material contained within the pores, wherein the oxide material is electrochemically active.

Preferably, the scaffold material is substantially stable under battery reaction conditions. The presence of the scaffold material can reduce sintering of the oxide material under operation of the battery electrode.

In some embodiments, at least one length dimension of the scaffold pore is between about 1-50 nm, such as about 5-25 nm. The pores physically constrain the oxide material in at least one dimension. In some embodiments, the pores physically constrain the oxide material in two dimensions. The pores can also physically constrain the oxide material in three dimensions (i.e., volumetrically). For example, in some embodiments, the size of the largest crystallite of oxide material is no larger than the largest pore in the scaffold material.

The scaffold material can be selected from the group consisting of carbon aerogel, mesoporous carbon, carbon nanotubes, carbon nanofoam, activated carbon, ruthenium oxide aerogel, indium tin oxide aerogel, and antimony tin oxide aerogel. The scaffold is preferably selected to have an electrical conductivity from about $10^{-3}$ S m$^{-1}$ to about $10^3$ S m$^{-1}$.

The oxide in the battery electrode of the invention can be selected from an oxide of iron, manganese, cobalt, or nickel. The oxide can also be selected from a ternary oxide of lithium with one of iron, manganese, cobalt, or nickel.

In various embodiments, the oxide can generally be selected from the group consisting of $Fe_2O_3$, $MnO_2$, $LiMnO_2$, $Mn_2O_3$, $LiMn_2O_4$, $CoO$, $LiCoO_2$, $SnO_2$, $SiO$, $Cr_2O_3$, $NiO$, $RuO_2$, and $VO_x$, wherein x is selected from 1 to 2.5.

The oxide material contained in the pores is preferably derived from a precursor in liquid form. The liquid form can be a molten metal salt, a molten metal salt hydrate, or a metal salt solution.

In other variations of the invention, a method of constructing a battery electrode is provided, the method comprising: (a) infiltrating a molten metal salt, molten metal salt hydrate, or metal salt solution into an electrically conductive scaffold material, wherein the scaffold material includes pores having at least one length dimension selected from about 0.5 nm to about 100 nm; and (b) decomposing the metal salt or the metal salt hydrate into one or more electrochemically active metal oxides.

The metal can be selected from the group consisting of Mn, Co, Fe, V, W, Ta, Nb, Ni, Cr, Ti, Ru, Mo, Sn, Si, and In. The metal salt can contain one or more anions selected from the group consisting of nitrate, sulfate, chloride, bromide, iodide, acetate, acetylacetonate, and oxalate. The scaffold material preferably does not react chemically with the molten metal salt, molten metal salt hydrate, or metal salt solution prior to step (b).

The decomposing step (b) can include heating the scaffold material in the presence of air to produce the one or more electrochemically active metal oxides. Alternatively, or additionally, the decomposing step (b) can include heating the scaffold material in the presence of nitrogen or argon (or another suitable inert gas) to produce the metal oxide(s).

In still other variations of the invention, a method of constructing a battery electrode is provided, the method comprising: (a) infiltrating a mixture comprising a lithium salt and a molten metal salt, molten metal salt hydrate, or metal salt solution into an electrically conductive scaffold material, wherein the scaffold material includes pores having at least one length dimension selected from about 0.5 nm to about 100 nm; and (b) decomposing the mixture into a ternary lithium metal oxide or lithium oxide plus metal oxide.

The metal can be selected from the group consisting of Mn, Co, Fe, V, W, Ta, Nb, Ni, Cr, Ti, Ru, Mo, Sn, Si, and In. The metal salt and the lithium salt can each independently contain one or more anions selected from the group consisting of nitrate, sulfate, chloride, bromide, iodide, acetate, acetylacetonate, and oxalate. The selected scaffold material preferably does not react chemically with the molten metal salt, molten metal salt hydrate, or metal salt solution prior to step (b). Also, the scaffold material preferably is not reactive to the lithium salt prior to step (b).

The scaffold material for these methods can be selected from the group consisting of carbon aerogel, mesoporous carbon, carbon nanotubes, carbon nanofoam, activated carbon, ruthenium oxide aerogel, indium tin oxide aerogel, and antimony tin oxide aerogel. The scaffold is preferably selected to have an electrical conductivity from about $10^{-3}$ S $m^{-1}$ to about $10^3$ S $m^{-1}$. In some embodiments, at least one length dimension of the scaffold pore is between about 1-50 nm, such as about 5-25 nm.

DETAILED DESCRIPTION OF EMBODIMENTS OF THE INVENTION

Figure 1:
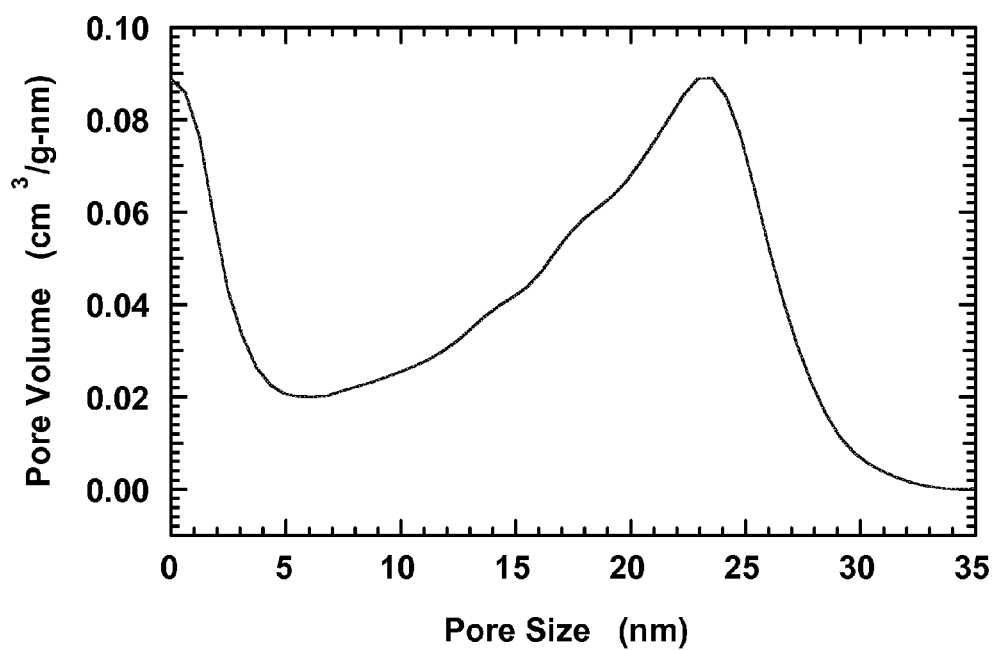
FIG. 1 shows the pore-size distribution of a carbon aerogel scaffold used to contain active battery materials, in some embodiments of the invention.

The systems and methods of the present invention will now be described in detail by reference to various non-limiting embodiments of the invention.

Unless otherwise indicated, all numbers expressing dimensions, capacities, reaction stoichiometries, and so forth used in the specification and claims are to be understood as being modified in all instances by the term "about." Without limiting the application of the doctrine of equivalents to the scope of the claims, each numerical parameter should at least be construed in light of the number of significant digits and by applying ordinary rounding techniques.

Some embodiments of the present invention will now be described in more detail, including reference to the accompanying figures. The figures provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein.

In some variations, this invention is premised on the discovery that battery lifetime and power can be increased by using an electrically conductive porous scaffold as a template to control the dimensions of and form connections to an active battery material. The scaffold pores limit the size of the battery material and preferably inhibit sintering. The scaffold pores can form conductive pathways to the active battery material nanoparticles. These battery materials absorb or emit electrons through electrochemical reactions.

The scaffold is a template to control, or at least influence, the size of the battery material as it is formed, preferably without altering it chemically. The scaffold pore size can be adjusted, as further described herein below. In preferred embodiments, the scaffold is conductive and provides an electrical contact between the electrode and active battery material. In some embodiments, the scaffold prevents sintering of the electrochemically active battery nanomaterial, and therefore prevents the fracture of bulk structures and loss of electrical contact during cycling.

Some variations of this invention provide a battery electrode material comprising nanoparticles of an active battery material incorporated in a conductive nanoporous scaffold. An active battery material is introduced and then contained in the nanopores of the scaffold, which acts as a template to determine the dimensions of the active material as it is formed in the scaffold. This nanoencapsulation of the active battery material results in small diffusion distances for lithium (or another suitable ion), which results in faster charge and discharge rates for the battery, and thus higher power.

The active battery material may be any oxide material, wherein for present purposes "oxides" means a material that contains $O^{2-}$. As used herein, oxides specifically include phosphates. Preferably, the selected oxide material has a precursor which can be infiltrated into the scaffold as a neat liquid or liquid solution. In this description, "infiltrate" means that the liquid precursor is introduced into the pores of the scaffold, so that dimensionally constrained oxide formation can occur within these pores. Of course, not all of a given liquid precursor may actually infiltrate pores, if an excess of liquid is used, for example.

In some embodiments, active battery materials can be selected from oxides of iron, manganese, cobalt, or nickel, or from ternary oxides of lithium plus iron, manganese, cobalt, or nickel. For example, the active battery material can be an oxide selected from the group comprising $Fe_2O_3$, $MnO_2$, $LiMnO_2$, $Mn_2O_3$, $LiMn_2O_4$, $CoO$, $LiCoO_2$, $SnO_2$, $SiO$, $Cr_2O_3$, $NiO$, $RuO_2$, and $VO_x$, wherein x is selected from 1 to 2.5. In the case of Li-ion batteries, the active battery material will chemically react with lithium ions to discharge or absorb electrons.

A variety of scaffold materials are possible as well. For example, electrically conductive scaffold materials include, but are not limited to, carbon aerogels, mesoporous carbons, activated carbons, carbon nanofoams, carbon xerogels, carbon nanotubes, carbon nanotube/nanofiber assemblies. In other embodiments, electrically conductive scaffold materials include ruthenium oxide aerogels, indium tin oxide aerogels, antimony tin oxide aerogels, and carbon-silica composite aerogels. Preferred scaffold materials possess an electrical conductivity selected from about $10^{-3}$ S $m^{-1}$ to about $10^3$ S $m^{-1}$. The scaffold preferably includes electrically conducting pathways to the active battery nanoparticles that are dispersed in three dimensions.

In some embodiments, carbon aerogels are employed. Carbon aerogels are composed of particles with sizes in the nanometer range, covalently bonded together. They have very high porosity (over 50%, with pore diameter generally less than 100 nm) and surface areas ranging between e.g. 400-2000 $m^2/g$.

In some embodiments, carbon xerogels are employed. A xerogel is a solid formed from a gel by drying with unhindered shrinkage. Xerogels usually retain high porosity (e.g., 25%) and surface area (e.g., 150-900 $m^2/g$), along with very small pore size (1-10 nm). When solvent removal occurs under supercritical conditions, the network does not shrink and a highly porous, low-density material is produced.

The scaffold material of the invention includes "pores" (e.g., nanopores and/or nanovoids) having at least one length dimension selected from about 0.5 nm to about 100 nm. In some embodiments, the scaffold material includes at least one length dimension selected from about 1 nm to about 50 nm, such as from about 5-25 nm. The average pore size of the conductive scaffold along with the pore-size distribution can be synthetically adjusted, as will be recognized by a skilled artisan.

Dimensions of about 10 nm or less can be preferable for certain battery chemical reactions. For example, the reaction $$Fe_2O_3 + 6Li \rightarrow 3Li_2O + 2Fe$$

is known to be mass-transfer limited and is difficult to carry out in bulk structures. Length dimensions of 5-10 nm, for example, would reduce diffusion distances for the reactants and products of this reaction, thereby enabling active electrochemistry.

When the pore is a nanopore or nanotube, the length dimension can be the diameter or the length of the nanopore or nanotube, for example. When the pore is an approximately spherical nanovoid, the length dimension can be the diameter of the nanovoid. Nominal or average diameters can also be used, such as when the pore is a tortuous channel having irregular diameter. For an arbitrary nanovoid, the length dimension can be calculated as an effective diameter that is the one-third root of the apparent nanovoid volume.

A pore should be large enough to contain a selected oxide material. Otherwise, the invention shall not be limited by a minimum length scale except in accordance with fundamental properties associated with the particular materials chosen (e.g., their molecular sizes). It is theoretically possible to employ pore dimensions even smaller than 0.5 nm, but practically speaking, pore dimensions of at least about one nanometer are desirable. On the high end, 100 nm is contemplated as a practical upper limit that can still take advantage of reduced diffusion distances and better electrochemical reaction kinetics.

These pores within the scaffold material physically constrain the oxide material in at least one dimension. Oxide material within a pore can be isolated from other oxide particles in other pores. Essentially, each pore can be regarded as a separate reactor. In some embodiments, the pores physically constrain the oxide material in at least two dimensions. In certain embodiments, the pores volumetrically constrain the oxide material (i.e., in three dimensions). Preferably, the size of the largest crystallite of oxide material is about the same as, or smaller than, the largest pore contained in the scaffold material.

The scaffold material can include various regular or irregular morphologies, including lamellar, hexagonal, cubic, and so on. Various amounts of crystallinity can be present, in addition to amorphous content. Some scaffold materials have an interconnected three-dimensional network structure with a high specific surface area, such as 100, 200, 300, 400, 500 $m^2/g$ or higher.

The amount of scaffold material, relative to the amount of active battery material, can vary widely. In various embodiments, the scaffold material can be present in an amount of about 10 wt % to about 90 wt % of the combined weight of the active battery material plus scaffold material. Preferably, the scaffold material is present in an amount less than about 70 wt %, more preferably less than about 50 wt %, and most preferably less than about 30 wt %.

In preferred embodiments, the scaffold material is substantially stable under battery reaction conditions. By "substantially stable" in this context, it is meant that during repeated cycling the scaffold material does not undergo significant physical changes that would reduce battery lifetime. Such physical changes include agglomeration leading to bulk structures with longer diffusion distances (lower power output) and/or less electrical contact with the electrode (reduces capacity).

Also, in preferred embodiments, the scaffold does not alter the chemical composition of the active battery material as it is being formed.

Some variations of this invention relate to methods. In some embodiments, a method of constructing a battery electrode comprises (a) infiltrating a molten metal salt, molten metal salt hydrate, or metal salt solution into an electrically conductive scaffold material with pores having at least one length dimension selected from about 0.5 nm to about 100 nm; and (b) decomposing the metal salt or metal salt hydrate into one or more electrochemically active metal oxides.

The metal can be selected from, for example, Mn, Co, Fe, V, W, Ta, Nb, Ni, Cr, Ti, Ru, Mo, Sn, Si, and/or In. The metal salt can contain one or more anions selected from nitrate, sulfate, chloride, bromide, acetate, acetylacetonate, and/or oxalate.

The decomposing step (b) can include heating the scaffold material in the presence of air to produce a metal oxide. Alternatively, an inert gas can be employed during step (b). In these embodiments, step (b) can include heating the scaffold material in the presence of nitrogen or argon to produce a metal oxide. Preferably, the scaffold material does not react chemically with the molten metal salt, molten metal salt hydrate, or metal salt solution prior to step (b).

In some embodiments, a method of constructing a battery electrode comprises (a) infiltrating a mixture comprising a lithium salt and a molten metal salt, molten metal salt hydrate, or metal salt solution into an electrically conductive scaffold material with pores having at least one length dimension selected from about 0.5 nm to about 100 nm; and (b) decomposing the mixture into a ternary lithium metal oxide and/or lithium oxide plus metal oxide.

The metal can again be selected from the group comprising Mn, Co, Fe, V, W, Ta, Nb, Ni, Cr, Ti, Ru, Mo, Sn, Si, and In. The metal salt and lithium salt each independently contains one or more anions selected from the group comprising nitrate, sulfate, chloride, bromide, iodide, acetate, acetylacetonate, and oxalate.

Preferably, the scaffold material does not react chemically with the molten metal salt, molten metal salt hydrate, or metal salt solution prior to step (b). Preferably, the scaffold material also does not react chemically with the lithium salt prior to step (b).

In some variations of the invention, the battery electrode as described and provided herein is included in a suitable construction for a battery. The battery can be used for power generation, including for example in laptop computers, mobile phones, cameras, medical devices, electric vehicles, and aerospace components. Electric vehicles, in particular, can benefit from batteries that offer long battery lifetimes with good cycling stability and high energy density, without compromising safety.

Certain embodiments of the present invention will now be further described with reference to the accompanying examples, which by no means should be construed to limit the invention.

Example 1

A carbon aerogel with a peak in the pore-size distribution at 25 nm is produced using resorcinol-formaldehyde condensation as partially described in Li et al., *Chem. Mater.* 2004, 16, 5676, which is hereby incorporated by reference herein to the extent there is no conflict with this specification.

First 20.70 g (188 mmol) resorcinol (Aldrich), 30.94 g of 36.5 wt % formaldehyde solution in water (376 mmol formaldehyde, Fluka), and 28.32 g deionized water are mixed until all materials are in solution. Then sodium carbonate (0.040 g, 0.377 mmol) is added and the mixture is stirred until dissolved. The solution is transferred in equal amounts to three 60-mL polypropylene jars, sealed, and aged 24 hrs at 23° C., 24 hrs at 50° C., and then 72 hrs at 90° C. The samples are then cooled, cut into cubes (0.75 cm/side), and immersed in acetone to displace the water. The acetone bath is poured off and refilled twice with at least one hour between cycles. The aerogel cubes are allowed to dry in air and then are heated in a tube oven under nitrogen from room temperature to 800° C. at 2.6° C./min and maintained at 800° C. for 6 hours to pyrolyze the resorcinol-formaldehyde gel.

Sample pore size, surface area, and pore volumes are characterized with $N_2$ absorption at Micromeritics Analytical Services (Norcross, Ga.). Data are analyzed using the Brunner-Emmett-Teller (BET) and Barrett-Joyner-Halenda (BJH) methods. The pore-size distribution is shown in FIG. 1, demonstrating that the sample has a peak in the pore-size distribution at about 25 nm and also contain micropores (<1 nm).

Example 2

Iron oxide-filled aerogels are produced by melting a hydrate of iron nitrate into the carbon aerogel described in Example 1 herein. 1.30 g of carbon aerogel as provided in Example 1 is evacuated and heated to 400° C. under vacuum for one hour to remove residual water from the pores. The flask containing the aerogel is cooled and backfilled with argon. Then 5 g of iron nitrate hydrate, $Fe(NO_3)_3.9H_2O$, is melted by heating to 60° C. The aerogel is placed in the molten iron nitrate and agitated for 10 min. The aerogel cubes are removed from the iron nitrate nonahydrate and placed in a glass beaker. The cubes are heated in air at 2° C./min to 150° C., are held at 150° C. for 8 hours, and then are cooled. Next the aerogel cubes are heated under argon at 2° C./min to 350° C., are held at 350° C. for 3 hours, and then are cooled.

To measure the iron oxide loading, thermogravimetric analysis (TGA) is performed using a TA 2950 analyzer (TA Instruments). The samples are heated at a ramp rate of 10° C./min to 1000° C. under flowing dry air which results in combustion of the aerogel. 26.33 wt % of the sample remains after combustion; this quantity is the iron oxide loading in the aerogel.

The material prepared is tested against lithium metal in a Swagelok cell. The electrolyte is 1 M $LiPF_6$ in 1:1 volume ratio of ethylene carbonate to dimethyl carbonate. The electrode is prepared by mixing 0.688 g of aerogel filled with iron oxide and 0.115 g of carbon black (MMM Super P) using pestle and mortar. The solids are then mixed with 0.344 g of poly(vinylidene fluoride-co-hexafluoropropylene) binder (Kynar Flex® 2801) in 8 mL of acetone to achieve a homogeneous slurry. The slurry is cast on glass and dried in air. Then, disks are punched out of the glass and dried at 110° C. under vacuum for 15 hours before transferring the electrode disks to a test cell including the electrolyte in an Argon-filled glove box. Electrochemical charge/discharge cycling is performed on an Arbin Battery Tester at a constant current of 0.2 mA/0.785 $cm^2$ between potentials 10 mV to 3.0 V vs. Li.

Figure 2:
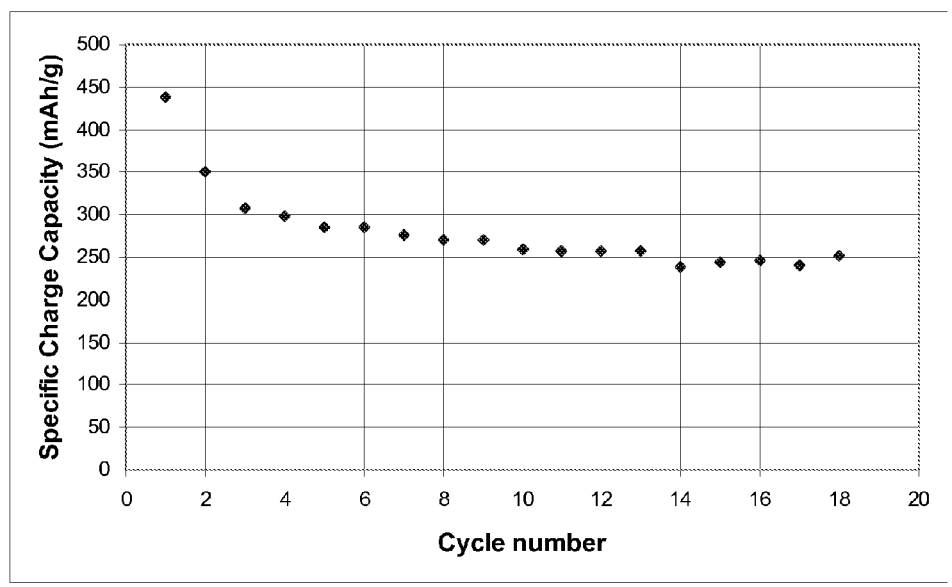
FIG. 2 demonstrates the cycling performance of a cell using an aerogel filled with iron oxide, cycled at C/6 rate, according to some embodiments.

FIG. 2 shows the capacity retention during cycling at C/6 rate. The C rate is conventionally used to describe battery loads or battery charging. A battery capacity rating in amp-hour is C, so C/6 means 6 hours of discharge. The specific capacity includes the weight of both the oxide and the carbon aerogel. When the weight and capacity contribution of the carbon aerogel are decoupled, the specific capacity of iron oxide is about 1400 mAh/g and drops to about 1000 mAh/g after 15 cycles.

Example 3

Cobalt oxide-filled aerogels are produced by melting a hydrate of cobalt nitrate into a carbon aerogel provided in Example 1. 1.26 g of this carbon aerogel is evacuated and heated to 400° C. under vacuum for one hour to remove residual water from the pores. The flask containing the aerogel is cooled and backfilled with argon. Then 5 g of $Co(NO_3)_2.6H_2O$ is melted by heating to 70° C. The aerogel is placed in the molten cobalt nitrate hexahydrate and agitated for 10 min until it has absorbed as much cobalt nitrate hydrate as possible. Then the aerogel cubes are removed from the liquid and placed in a glass beaker. The cubes are heated in air at 2° C./min to 150° C., are held at 150° C. for 8 hours, and then are cooled. Next the aerogel cubes are heated under argon at 2° C./min to 350° C., are held at 350° C. for 3 hours, and then are cooled.

Figure 3:
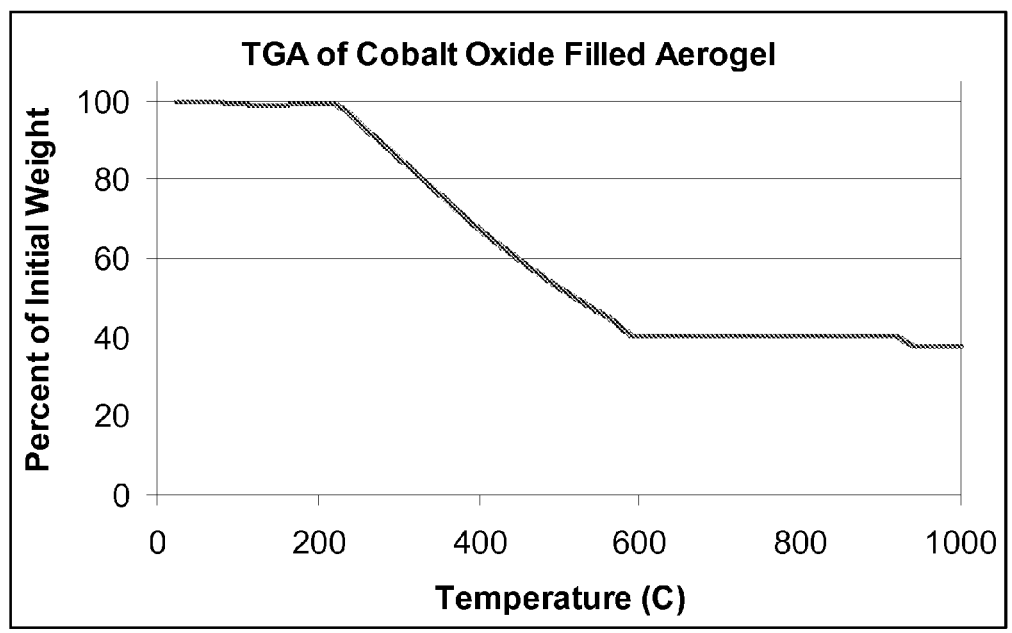
FIG. 3 presents the results of thermogravimetric analysis for an exemplary aerogel with cobalt oxide.

To measure the cobalt oxide loading, TGA is performed using a TA 2950 analyzer (TA Instruments). The samples are heated at a ramp rate of 10° C./min to 1000° C. under flowing dry air which results in combustion of the aerogel. The TGA data is shown in FIG. 3, where weight loss below 600° C. is indicative of combustion of the aerogel (generation of $CO_2$) and weight loss at 900-950° C. is indicative of the conversion of $Co_3O_4$ to CoO. The presence of the 900-950° C. conversion implies that the aerogel comprises $Co_3O_4$, and the TGA data indicates that the loading of $Co_3O_4$ is 40.4 wt %.

The material prepared in this Example 3 is tested against lithium metal in a Swagelok cell. The electrolyte is 1 M $LiPF_6$ in a 1:1 volume ratio of ethylene carbonate to dimethyl carbonate. The anode is prepared by mixing 0.688 g of aerogel filled with cobalt oxide and 0.115 g of carbon black (MMM Super P) using pestle and mortar. The solids are then mixed with 0.344 g of poly(vinylidene fluoride-co-hexafluoropropylene) binder (Kynar Flex 2801) in 8 mL of acetone to achieve a homogeneous slurry. The slurry is cast on glass and dried in air. Then, disks are punched out of the glass and dried at 110° C. under vacuum for 15 hours before transferring the electrode disks to a test cell including the electrolyte in an Argon-filled glove box. Electrochemical charge/discharge cycling is performed on an Arbin Battery Tester at a constant current of 0.2 mA/0.785 $cm^2$ between potentials 10 mV to 3.0 V vs. Li.

Figure 4:
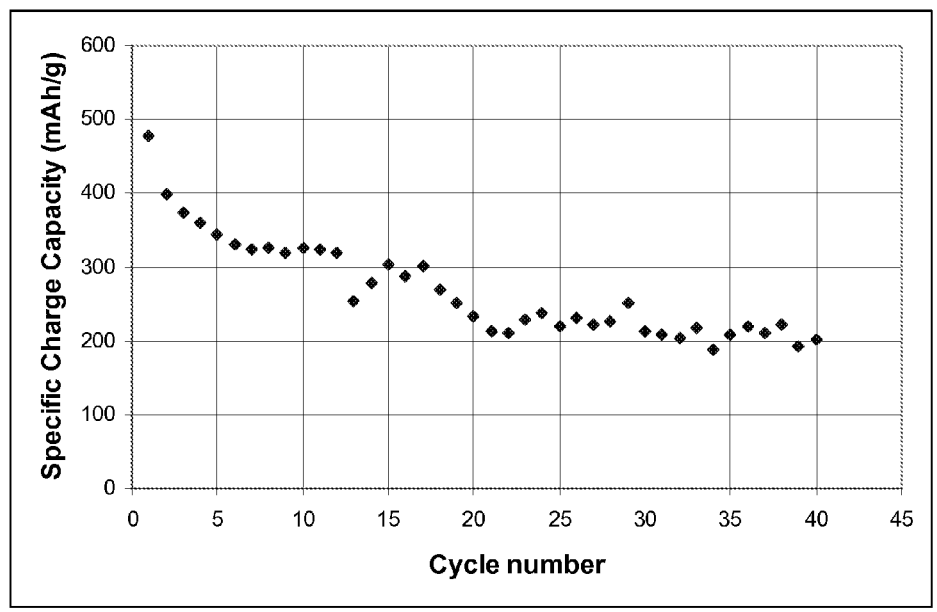
FIG. 4 illustrates the cycling performance of a cell using an aerogel filled with cobalt oxide, cycled at C/7 rate, according to some embodiments.

FIG. 4 shows the capacity retention during cycling. The specific capacity includes the weight of both the oxide and the carbon aerogel. When the weight and capacity contribution of the carbon aerogel are decoupled, the specific capacity of cobalt oxide is about 1000 mAh/g and drops to about 800 mAh/g after 15 cycles. Within experimental error, this capacity indicates a complete reduction of $Co_2O_3$ to $Li_2O$ and Co which provides a theoretical capacity of 970 mAh/g.

Example 4

Manganese oxide-filled aerogels are produced by melting a hydrate of manganese nitrate into a carbon aerogel as provided in Example 1. 1.317 of this carbon aerogel is evacuated and heated to 400° C. under vacuum for one hour to remove residual water from the pores. The flask containing the aerogel is cooled and backfilled with argon. Then 4.5 g of $Mn(NO_3)_2.4H_2O$ is melted by heating to 60° C. The aerogel is placed in the molten manganese nitrate tetrahydrate and agitated for 10 min until it absorbs as much manganese nitrate tetrahydrate as possible. Then the aerogel cubes are removed from the liquid and placed in a glass beaker. The cubes are heated in air at 100° C. for one hour to drive off residual water and then are heated at 2° C./min to 200° C., are held at 200° C. for 8 hours, and then are cooled. An infrared absorption spectrum is collected and no $NO_3$-absorption peaks are detected, indicating that all manganese nitrate has decomposed to manganese oxide.

To measure the manganese oxide loading, TGA is performed using a TA 2950 analyzer (TA Instruments). The samples are heated at a ramp rate of 10° C./min to 1000° C. under flowing dry air which results in combustion of the aerogel. 45.9 wt % of the sample remains after combustion; this quantity is regarded as the manganese oxide loading in the aerogel.

The material prepared in this Example 4 is tested against lithium metal in a Swagelok cell. The electrolyte is 1 M $LiPF_6$ in a 1:1 volume ratio of ethylene carbonate to dimethyl carbonate. The anode is prepared by mixing 0.688 g of aerogel filled with manganese oxide and 0.115 g of carbon black (MMM Super P) using pestle and mortar. The solids are then mixed with 0.344 g of poly(vinylidene fluoride-co-hexafluoropropylene) binder (Kynar Flex 2801) in 8 mL of acetone to achieve a homogeneous slurry. The slurry is cast on glass and dried in air. Then, disks are punched out of the glass and dried at 110° C. under vacuum for 15 hours before transferring the electrode disks to a test cell including the electrolyte in an Argon-filled glove box. Electrochemical charge/discharge cycling is performed on an Arbin Battery Tester at a constant current of 0.2 mA/0.785 $cm^2$ between potentials 10 mV to 3.0 V vs. Li.

Figure 5:
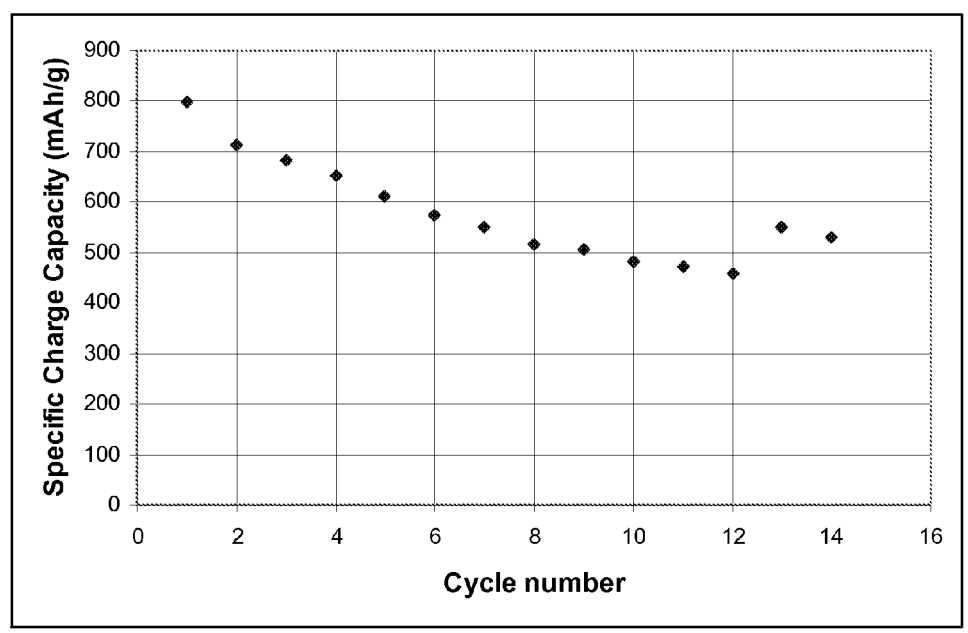
FIG. 5 demonstrates the cycling performance of a cell using an aerogel filled with manganese oxide, cycled at C/8 rate, according to some embodiments.

FIG. 5 shows the reversible capacity as a function of cycle number. When the weight and capacity contribution of the carbon aerogel are decoupled, the specific capacity of manganese oxide is about 1570 mAh/g and drops to about 900 mAh/g after 10 cycles. Within experimental error, this capacity indicates a complete reduction of $MnO_2$ to $Li_2O$ and Mn which provides a theoretical capacity of 1232 mAh/g.

Example 5

Manganese oxide-filled aerogels are produced using an alternative method to the one described in Example 4, by infiltrating a nitric acid solution of manganese nitrate into a carbon aerogel provided in Example 1. 1.290 g of this carbon aerogel is evacuated and heated to 400° C. under vacuum for one hour to remove residual water from the pores The flask containing the aerogel is cooled and backfilled with argon. Then 17.25 g of $Mn(NO_3)_2.4H_2O$, 0.696 g of ~70 wt % nitric acid, and 2.054 g deionized water are mixed and heated at 50° C. to form a homogeneous solution. The aerogel is placed in 5 g of the nitric acid solution of manganese nitrate and agitated for 20 min. Then the aerogel cubes are removed and placed in a glass beaker. The cubes are heated in air at 100° C. for one hour to drive off residual water and are then heated at 2° C./min to 200° C., are held at 200° C. for 8 hours, and then are cooled.

Figure 6:
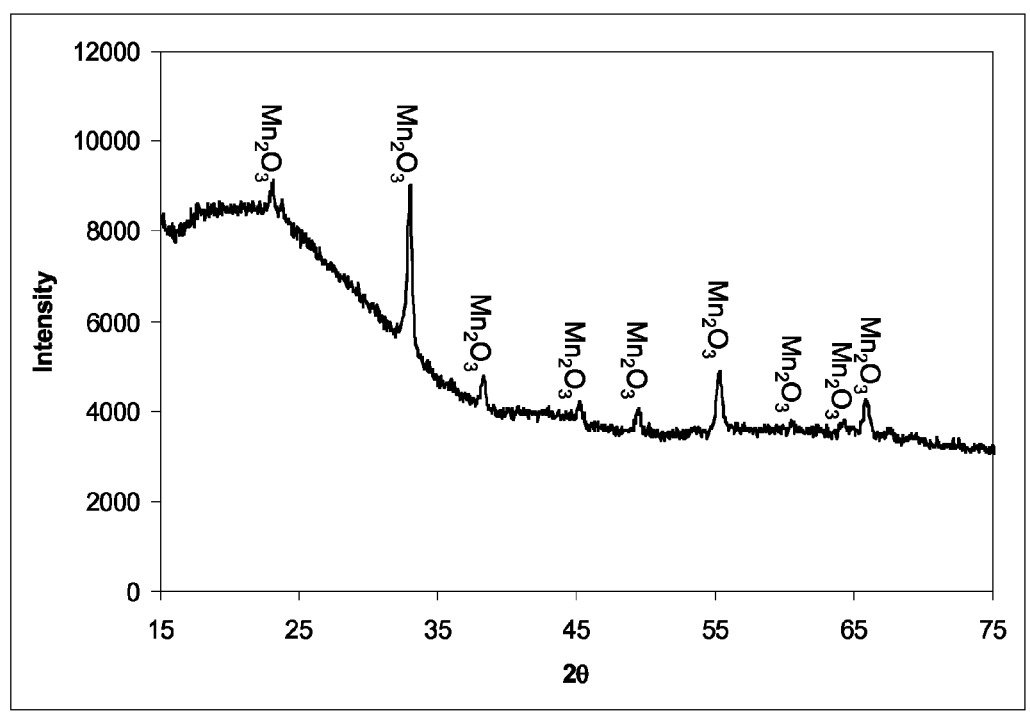
FIG. 6 shows XRD data for an aerogel with manganese oxide, in certain embodiments of the invention.

X-ray diffraction (XRD) of the sample is depicted in FIG. 6. The XRD data includes broad peaks which indicate small domain sizes of $Mn_2O_3$.

To measure the manganese oxide loading, TGA is performed using a TA 2950 analyzer (TA Instruments). The samples are heated at a ramp rate of 10° C./min to 1000° C. under flowing dry air which results in combustion of the aerogel. The 41.3 wt % of the sample that remains after combustion is regarded as the manganese oxide loading in the aerogel.

To ensure no reaction with the aerogel occurs, a carbon aerogel cube made as described in this example is evacuated and heated to 400° C. under vacuum for one hour to remove residual water from the pores The flask containing the aerogel is cooled and backfilled with argon. The cube is soaked in a 2.4 wt % nitric acid solution. This concentration is selected because it is the same nitric acid concentration used in the manganese nitrate solution in this example. The cube is soaked for 1 hr, then heated in air at 100° C. for one hour to drive off residual water and then heated at 2° C./min to 200° C., held at 200° C. for 8 hours, and then cooled. The mass changes from 0.168 g to 0.172 g, which is within the error range of two sample masses taken 4 hours apart. Since no appreciable mass change occurs, it can be concluded that the aerogel is essentially inert during active battery material incorporation.

Example 6

Lithium manganese oxide-filled aerogels are produced by infiltrating a solution of lithium nitrate dissolved in molten manganese nitrate tetrahydrate into a carbon aerogel provided in Example 1. 1.297 g of this carbon aerogel is evacuated and heated to 400° C. under vacuum for one hour to remove residual water from the pores. The flask containing the aerogel is cooled and backfilled with argon. Then 5.995 g of $Mn(NO_3)_2.4H_2O$ plus 1.647 g of lithium nitrate is mixed and heated to 50° C. to form a homogeneous solution. The aerogel is placed in 5 g of the solution of lithium nitrate in manganese nitrate tetrahydrate and agitated for 10 min until it has absorbed as much solution as possible. Then the aerogel cubes are removed and placed in a glass beaker. The cubes are heated in air at 100° C. for one hour to drive off residual water and then are heated at 2° C./min to 200° C., are held at 200° C. for 8 hours, and then are cooled. Next the aerogel cubes are heated under argon at 2° C./min to 500° C., are held at 500° C. for 8 hours, and are then cooled in order to fully decompose the lithium nitrate.

X-ray diffraction (XRD) of the sample (not shown) indicates small MnO peaks, implying the aerogel is filled with manganese oxide and amorphous lithium oxide.

To measure the lithium manganese oxide loading, TGA is performed using a TA 2950 analyzer (TA Instruments). The samples are heated at a ramp rate of 10° C./min to 1000° C. under flowing dry air which results in combustion of the aerogel. The 42.1 wt % of the sample remaining after combustion is the lithium manganese oxide loading in the aerogel.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A battery electrode comprising:
   (a) a scaffold material including pores having at least one length dimension of pores selected from about 0.5 nm to about 100 nm, wherein said scaffold material is a covalently bonded and interconnected three-dimensional network, and wherein said scaffold material has an electrical conductivity selected from about $10^{-3}$ S m$^{-1}$ to about $10^3$ S m$^{-1}$; and
   (b) a metal oxide battery material filled within said pores, wherein said metal oxide battery material is electrochemically active, wherein said metal oxide battery material is fully reducible to the corresponding metal under battery reaction conditions, wherein said at least one length dimension of pores is a template to determine the size of said metal oxide material filled within said pores, and wherein the size of the largest crystallite of said metal oxide material is about the same as the largest pore contained in said scaffold material.

2. The battery electrode of claim 1, wherein said scaffold material is substantially stable under said battery reaction conditions.

3. The battery electrode of claim 1, wherein the presence of said scaffold material reduces sintering of said metal oxide material under operation of said battery electrode.

4. The battery electrode of claim 1, wherein said at least one length dimension of said pore is selected from about 1 nm to about 50 nm.

5. The battery electrode of claim 4, wherein said at least one length dimension of said pore is selected from about 5 nm to about 25 nm.

6. The battery electrode of claim 1, wherein said pores physically constrain said metal oxide material in at least two dimensions.

7. The battery electrode of claim 6, wherein said pores volumetrically constrain said metal oxide material.

8. The battery electrode of claim 1, wherein said scaffold material is selected from the group consisting of carbon aerogel, mesoporous carbon, carbon nanotubes, carbon nanofoam, ruthenium oxide aerogel, indium tin oxide aerogel, antimony tin oxide aerogel, and any combination thereof.

9. The battery electrode of claim 8, wherein said scaffold material is carbon aerogel.

10. The battery electrode of claim 1, wherein said scaffold material includes electrically conducting pathways to active nanoparticles of said metal oxide material dispersed in three dimensions.

11. The battery electrode of claim 1, wherein said metal oxide is selected from an oxide of iron, manganese, cobalt, or nickel.

12. The battery electrode of claim 1, wherein said metal oxide is selected from a ternary oxide of lithium with one of iron, manganese, cobalt, or nickel.

13. The battery electrode of claim 1, wherein said metal oxide is selected from the group consisting of $Fe_2O_3$, $MnO_2$, $LiMnO_2$, $Mn_2O_3$, $LiMn_2O_4$, $CoO$, $LiCoO_2$, $SnO_2$, $SiO$, $Cr_2O_3$, $NiO$, $RuO_2$, $VO_x$, wherein x is selected from 1 to 2.5, and any combination thereof.

14. The battery electrode of claim 1, wherein said metal oxide material contained in said pores is derived from a precursor in liquid form.

15. The battery electrode of claim 14, wherein said liquid form is a molten metal salt, a molten metal salt hydrate, or a metal salt solution.

* * * * *